United States Patent
Song et al.

(10) Patent No.: US 9,903,649 B2
(45) Date of Patent: Feb. 27, 2018

(54) DRYER FOR ELECTRODE SUBSTRATE OF RECHARGEABLE BATTERY AND CONTROLLING METHOD OF THE SAME

(71) Applicant: SAMSUNG SDI CO., LTD., Yongin-si, Gyeonggi-do (KR)

(72) Inventors: Kwan-Seop Song, Yongin-si (KR); Kyoung-Heon Heo, Yongin-si (KR); Ji-Hyang Park, Yongin-si (KR); Gi-Sung Kim, Yongin-si (KR); Seon-Hyeok An, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 681 days.

(21) Appl. No.: 13/924,507

(22) Filed: Jun. 21, 2013

(65) Prior Publication Data

US 2014/0201983 A1    Jul. 24, 2014

(30) Foreign Application Priority Data

Jan. 23, 2013   (KR) .................. 10-2013-0007547

(51) Int. Cl.
*H01M 4/04*  (2006.01)
*F26B 13/12*  (2006.01)
*F26B 13/08*  (2006.01)

(52) U.S. Cl.
CPC .............. *F26B 13/12* (2013.01); *F26B 13/08* (2013.01); *H01M 4/0409* (2013.01); *H01M 4/0435* (2013.01); *Y10T 29/49112* (2015.01)

(58) Field of Classification Search
CPC ....... F26B 13/08; F26B 13/12; H01M 4/0409; H01M 4/0435; Y10T 29/49112

(Continued)

(56) References Cited

U.S. PATENT DOCUMENTS

2002/0171350 A1   11/2002   Kim et al.
2004/0123450 A1    7/2004   Ward et al.
(Continued)

FOREIGN PATENT DOCUMENTS

CN   1387227 A   12/2002
CN   1473369 A    2/2004
(Continued)

OTHER PUBLICATIONS

Englsih translation of Uchida JP 2010225467 A, Oct. 2010, Japanese.*

(Continued)

*Primary Examiner* — Jonathan Jelsma
*Assistant Examiner* — Rashid Alam
(74) *Attorney, Agent, or Firm* — Lewis Roca Rothgerber Christie LLP

(57) ABSTRACT

A dryer for an electrode substrate of a rechargeable battery according to an exemplary embodiment of the present invention includes: a drying oven for drying an electrode substrate by feeding the electrode substrate to an inlet and discharging it through an outlet; fixed guide rolls provided at a distance from each other between the inlet and the outlet to guide the electrode substrate; lifting guide rolls ascended or descended at one side of the respective fixed guide rolls to guide the moving electrode substrate; driving rolls disposed to correspond to locations of the lifting guide rolls; and a shuttle moving toward the outlet from the inlet.

9 Claims, 4 Drawing Sheets

(58) Field of Classification Search
USPC .......................................................... 29/623.3
See application file for complete search history.

(56) References Cited

U.S. PATENT DOCUMENTS

| | | | |
|---|---|---|---|
| 2011/0052954 A1 | 3/2011 | Fujiwara et al. | |
| 2011/0067260 A1 | 3/2011 | Kim et al. | |
| 2012/0285036 A1* | 11/2012 | Matsuyama | ............ F26B 13/10 34/406 |

FOREIGN PATENT DOCUMENTS

| | | | |
|---|---|---|---|
| CN | 101978531 A | | 2/2011 |
| CN | 102773208 A | | 11/2012 |
| JP | 2010225467 A | * | 10/2010 |
| JP | 10-2011-0032282 | | 3/2011 |
| JP | 2011-238474 A | | 11/2011 |
| KR | 10-2010-0110059 | | 10/2010 |

OTHER PUBLICATIONS

Machine English Translation of JP 2011-238474 A, listed above, 16 pages.
SIPO Office Action dated Apr. 1, 2017, for corresponding Chinese Patent Application No. 201410003326.X (9 pages).
SIPO Office Action dated Dec. 18, 2017, for corresponding Chinese Patent Application No. 201410003326.X (11 pages).

* cited by examiner

DRYER FOR ELECTRODE SUBSTRATE OF RECHARGEABLE BATTERY AND CONTROLLING METHOD OF THE SAME

CROSS-REFERENCE TO RELATED APPLICATION

This application claims priority to and the benefit of Korean Patent Application No. 10-2013-0007547 filed in the Korean Intellectual Property Office on Jan. 23, 2013, the entire content of which is incorporated herein by reference.

BACKGROUND

1. Field

The described technology relates generally to a dryer for an electrode substrate of a rechargeable battery, and a control method thereof.

2. Description of the Related Art

A dryer for an electrode substrate of a rechargeable battery is used to dry an active material coated on the electrode substrate. For example, the dryer for the electrode substrate transfers an increased temperature of a sheath heater as hot air into a drying oven using a supply fan so as to dry the active material of the electrode substrate.

For example, an N-methyl-2-pyrrolidone (NMP)-based active material is used in a negative electrode substrate, and an aqueous active material is used in a negative electrode substrate. During drying, the aqueous active material coated to the negative electrode substrate consumes a large amount of heat. Thus, the dryer for the electrode substrate may be formed by selectively combining an auxiliary sheath heater or an infrared ray lamp to the hot-air method.

For example, the dryer for the electrode substrate is provided with guide rolls for transferring the electrode substrate. The guide rolls are fixed to an inner wall of the dryer. The electrode substrate may be disconnected in an initial stage during which the electrode substrate is first supplied to the dryer for the electrode substrate or in a drying process, and in this case, the disconnected electrode substrate should be connected from an inlet of the dryer to an outlet of the dryer in order to transfer and dry the electrode substrate between the inlet and the outlet.

For example, the electrode substrate may be moved from the inlet to the outlet by providing a guide rail in the inner wall of the dryer or using a sprocket and a chain so as to connect the electrode substrate from the inlet to the outlet.

That is, an additional guide rail should be provided or the sprocket and the chain should be provided to connect the electrode substrate from the inlet to the outlet. Accordingly, connection of the electrode substrate from the inlet to the outlet is inconvenient.

The above information disclosed in this Background section is only for enhancement of understanding of the background of the described technology and therefore it may contain information that does not form the prior art that is already known in this country to a person of ordinary skill in the art.

SUMMARY

An aspect of an embodiment of the present invention is directed toward a dryer for an electrode substrate of a rechargeable battery that can provide convenience in connection of an electrode substrate in an initial stage for supplying the electrode substrate or during a drying process. An aspect of an embodiment of the present invention is directed toward a method for controlling the dryer for the electrode substrate of the rechargeable battery.

A dryer for an electrode substrate of a rechargeable battery according to an embodiment includes: a drying oven for drying an electrode substrate by feeding the electrode substrate to an inlet and discharging the electrode substrate through an outlet; fixed guide rolls provided at a distance from each other between the inlet and the outlet to guide the electrode substrate; lifting guide rolls at one side of the respective fixed guide rolls to guide the moving electrode substrate; driving rolls disposed to correspond to locations of the lifting guide rolls; and a shuttle moving toward the outlet from the inlet.

The lifting guide rolls have an ascended location and a descended location. The driving rolls may be disposed corresponding to descended location of the lifting guide rolls.

The shuttle may be moved in a state of being connected with the electrode substrate and supported by the driving rolls and the lifting guide rolls.

The fixed guide rolls may be provided in plural, and the lifting guide rolls may be provided in plural so as to be ascended to a highest position and descended to a lowest position between the fixed guide rolls.

The fixed guide rolls have a lowest surface and the lifting guide rolls have a highest surface. The highest surface of the lifting guide rolls descended to the lowest position may be set to be lower than the lowest surface of the fixed guide rolls.

The fixed guide rolls have an upper side and a lower side. The driving rolls may be provided in plural and disposed at a distance from each other in the lower side of the fixed guide rolls.

The driving rolls have a highest surface. The highest surface of the lifting guide rolls, set in the state that the lifting guide rolls are descended to the lowest position may be set to be at a height the same as the highest surface of the driving rolls.

The dryer for the electrode substrate of the rechargeable battery according to the exemplary embodiment may further include a travelling roll provided in an outer side of the outlet to make the electrode substrate travel.

A method for controlling a dryer for an electrode substrate of a rechargeable battery according to an embodiment includes: a first step for preparing an electrode substrate coated with an active material; a second step for attaching the electrode substrate to a shuttle; a third step for matching the highest surface of a plurality of lifting guide rolls in a drying oven and the highest surface of a plurality of driving rolls by descending the lifting guide rolls; and a fourth step for connecting the electrode substrate by feeding the shuttle to an inlet of the drying oven and discharging the shuttle through an outlet of the drying oven while being supported by the driving rolls being driven and the lifting guide rolls.

The method for controlling the dryer for the electrode substrate of the rechargeable battery according to the exemplary embodiment may further include a fifth step for moving the electrode substrate hung between the lifting guide rolls and the fixed guide rolls in a zigzagged manner by ascending the lifting guide rolls and drying the electrode substrate.

During the first step, the active material coated to the electrode substrate may be primarily dried and then the electrode substrate may be passed through a rolling process.

During the fourth step, the electrode substrate may be moved in a horizontal state between the inlet and the outlet.

A system for controlling a dryer for an electrode substrate of a rechargeable battery according to an embodiment includes: means for preparing an electrode substrate coated with an active material; means for attaching the electrode substrate to a shuttle; means for matching a highest surface of a plurality of lifting guide rolls in a drying oven and a highest surface of a plurality of driving rolls by descending the lifting guide rolls; and means for connecting the electrode substrate by feeding the shuttle to an inlet of the drying oven and discharging the shuttle through an outlet of the drying oven while being supported and driven by the driving rolls and supported by the lifting guide rolls.

The system may further includes means for moving the electrode substrate hung between the lifting guide rolls and the fixed guide rolls in a zigzagged manner by ascending the lifting guide rolls to dry the electrode substrate.

As described, according to the embodiments, the electrode substrate is connected to the shuttle and the shuttle is moved from the inlet to the outlet while being supported by the driving rolls and the lifting guide rolls so that the electrode substrate can be conveniently connected from the inlet to the outlet.

DETAILED DESCRIPTION

Figure 1:
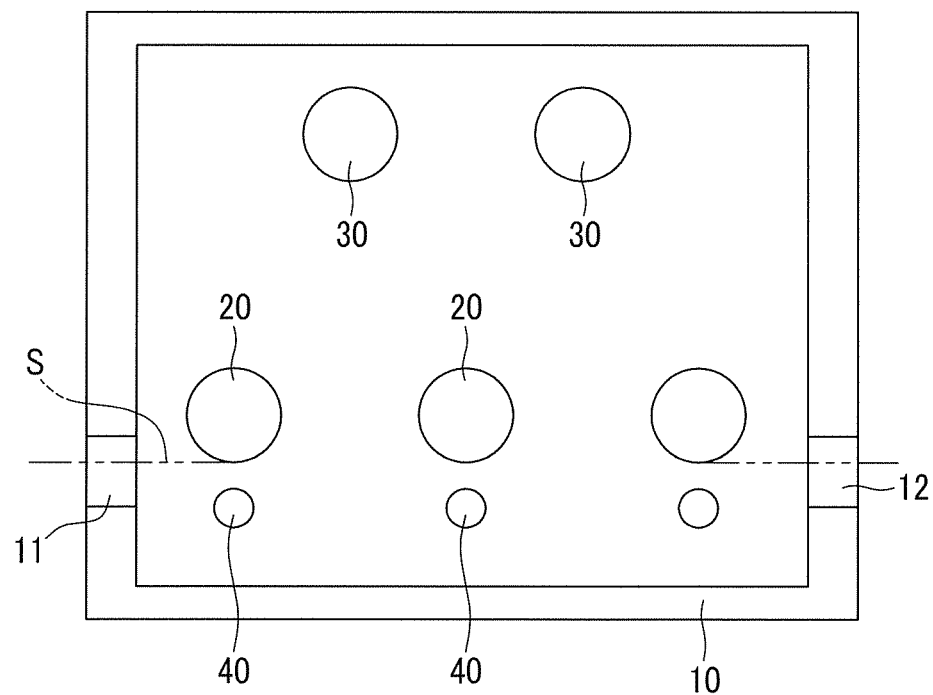
FIG. 1 is a schematic diagram of a dryer for an electrode substrate of a rechargeable battery according to an exemplary embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
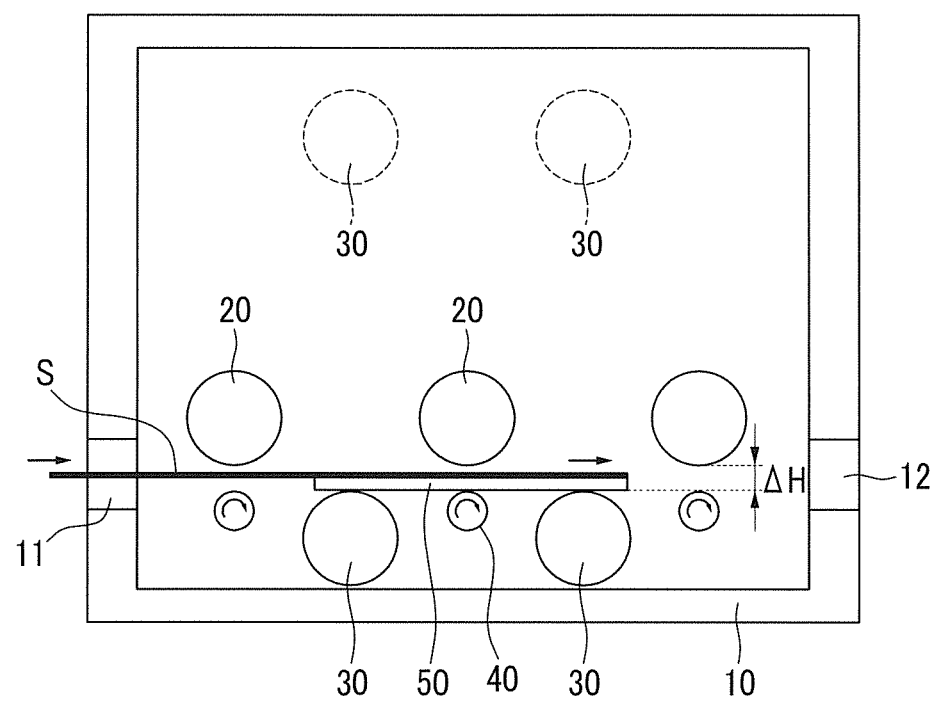
FIG. 2 is a view of an operation state that connects an electrode substrate to the dryer for the electrode substrate of the rechargeable battery of FIG. 1.

FIG. 1 is a schematic diagram of a dryer for an electrode substrate of a rechargeable battery according to an embodiment of the present invention, and FIG. 2 is a view of an operation state that connects an electrode substrate to the dryer for the electrode substrate of the rechargeable battery of FIG. 1.

Referring to FIG. 1 and FIG. 2, a dryer for an electrode substrate of a rechargeable battery is formed to primarily dry an active material coated to an electrode substrate S, or secondarily dry the active material of the electrode substrate S that passed through a rolling process after a primary drying process. Hereinafter, a "dryer for the electrode substrate" will be referred to as a "dryer". In embodiments of the present invention, the electrode substrate S coated with the active material is supplied either as a roll with an outer free end at the outer surface of the roll and an inner end at the core of the roll, or as a continuous sheet with a leading edge closest to the dryer and a trailing edge farthest from the dryer. In either case, the free end or the leading edge should be fed from the inlet of the dryer, travel through the dryer, and be discharged from the outlet of the dryer (an action referred to as "connect" or "connecting" or "connection of" the electrode substrate herein after unless otherwise noted) to enable drying of the active material coated on the electrode substrate.

The dryer according to an embodiment is formed to make the electrode substrate S to travel in a manner of a zigzag using a roll-to-roll method in a drying oven 10 and to dry an active material on the travelling electrode substrate S.

In addition, the dryer according to an embodiment is formed to connect the electrode substrate S from an inlet 11 of the drying oven 10 to an outlet 12 thereof in an initial stage during which the electrode substrate S is fed to the dry oven 10 or when the electrode substrate S is cut off.

Although it is not illustrated, the rechargeable battery may be formed by installing the electrode assembly that performs charging and discharging and an electrolyte solution in a battery case and installing a cap assembly electrically connected to the electrode assembly in the opening of the case.

The electrode assembly is formed by spirally winding a negative electrode and a positive electrode that are layered while having a separator therebetween, to a jelly roll state. The dryer according to an embodiment dries an active material coated to the electrode substrate S that forms the negative electrode and the positive electrode in the rechargeable battery.

Also, the dryer is provided between an unwinding station and a winding station to dry the electrode substrate S supplied from the unwinding station in the drying oven 10 and then supply the dried electrode substrate S to the winding station.

The dryer includes fixed guide rolls 20, lifting guide rolls 30 guiding movement of the electrode substrate S, driving rolls 40 and a shuttle 50. The driving rolls 40 and the shuttle 50 are provided for connection of the electrode substrate S. The fixed guide rolls 20, the lifting guide rolls 30, the driving rolls 40, and the shuttle 50 are provided in the drying oven 10.

The drying oven 10 is provided with an inlet 11 on one side and an outlet 12 on the other side along a horizontal direction to pass the electrode substrate S fed to the inlet 11 to the outlet 12 and either dry the active material coated to the electrode substrate S or dry the rolled up electrode substrates after the primary drying process.

The fixed guide rolls 20 are provided at a distance between the inlet 11 and the outlet 12 to guide the electrode substrate S moving while rotating in the drying oven 10. The fixed guide rolls 20 are provided corresponding to the inlet 11 and the outlet 12 in a lower portion in the drying oven 10 to guide the electrode substrate S while being in contact with an upper surface of the travelling electrode substrate S. That is, the height of the lowest surface of the fixed guide roll 20 inside the dryer corresponds to the height of the upper surface of the electrode substrate S traveling inside the dryer.

The lifting guide rolls 30 may be provided in the plural and may move up and down on one side of the fixed guide rolls 20 and are fixed at set or predetermined locations to guide the moving electrode substrate S. That is, the lifting guide rolls 30 are mounted to move to an upper portion and a lower portion in the drying oven 10, interposing the fixed guiding rolls 20 therebetween. For example, the lifting guide rolls 30 may be fixed to a set or predetermined lower location during a process for drying the active material of the electrode substrate S and may be fixed to a set or predetermined upper location during a process for connecting the electrode substrate S.

Figure 3:
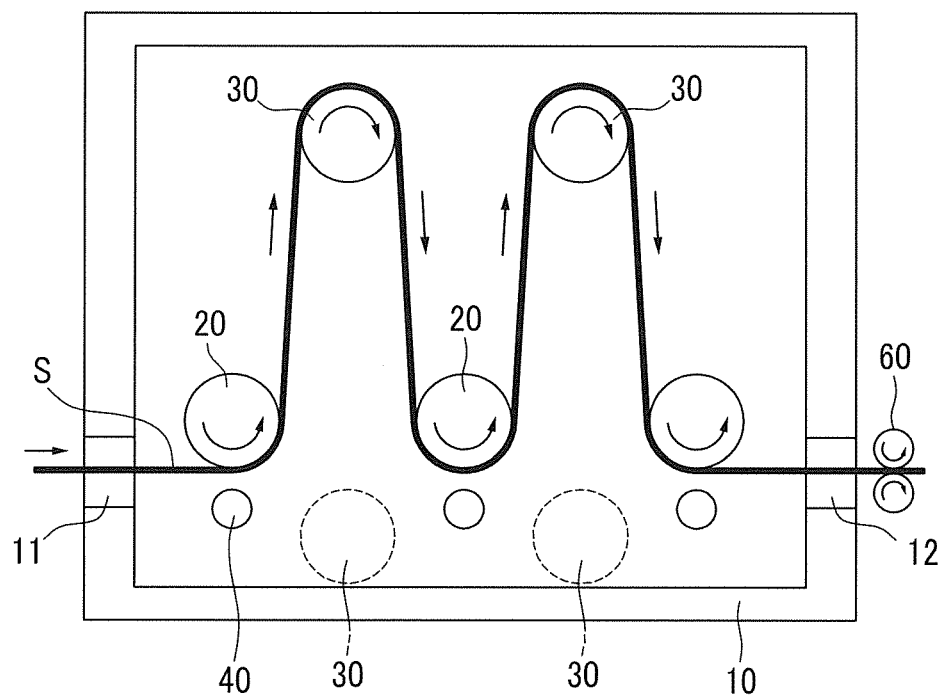
FIG. 3 is a view of an operation state that dries the electrode substrate after the connection between the electrode substrate and the dryer for the electrode substrate of the rechargeable battery of FIG. 2 is established.

FIG. 3 shows a state illustrating operation for drying the electrode substrate after connecting the electrode substrate to the dryer of the rechargeable battery of FIG. 2. Referring to FIG. 3, the dryer may further include travelling rolls 60 provided in an external side of the outlet 12.

Referring to FIG. 1 to FIG. 3, when the lifting guide rolls 30 are lifted and thus located in an upper portion of the drying oven 10, the electrode substrate S may move in a zigzag manner while being guided between the lifting guide rolls 30 and the fixed guide rolls 20.

For this purpose, in an embodiment, three fixed guide rolls 20 are provided and two lifting guide rolls 30 are provided to be movable up and down between the fixed guide rolls 20.

Prior to connecting the electrode substrate S, the lifting guide rolls 30 are moved down and then located in the lower portion in the drying oven 10 in order not to disrupt the horizontal movement of the electrode substrate S. In this case, the lifting guide rolls 30 are located lower than the fixed guide rolls 20.

The driving rolls 40 are located in a lower portion in the drying oven 10 to correspond to the lifting guide rolls 30 in the descended state. When the electrode substrate S is being connected, the driving rolls 40 provide a driving force to the electrode substrate S that is attached to the shuttle 50, which horizontally moves between the inlet 11 and the outlet 12.

That is, the driving rolls 40 perform rotary motion by a driving source. In this case, the lifting guide rolls 30 perform idle rotation due to a friction with the shuttle 50 that connects the travelling electrode substrate S. The fixed guide rolls 20 stand still above the electrode substrate S so as not to disrupt travelling of the electrode substrate S.

The shuttle 50 is normally kept separately in the outside of the drying oven 10, and when the electrode substrate S is disconnected in an initial supply stage or during a drying process and thus the electrode substrate S needs to be connected from the inlet 11 to the outlet 12, the shuttle 50 is used to connect the electrode substrate S.

For example, the shuttle 50 is provided to be capable of feeding the electrode substrate S to the inlet 11 by straightly reciprocating by a pinion or rack driven by a motor or a cylinder operated by compressed air.

An end of the electrode substrate S can be attached to the shuttle 50. The shuttle 50 is then supported by the lifting guide rolls 30 in the descended state and the driving rolls 40 to perform horizontal movement and connect the electrode substrate S from the inlet 11 to the outlet 12.

For this purpose, the highest surface of the lifting guide rolls 30 is set to be lower than the lowest surface of the fixed guide rolls 20 while the lifting guide rolls 30 are in a state of being descended to the lowest position. In addition, a height difference ΔH is set between the lowest surface of the fixed guide rolls 20 and the highest surface of the lifting guide rolls 30. The height difference ΔH enables the shuttle 50 having the electrode substrate S connected thereto to pass through the fixed guide rolls 20 without being disrupted by the lowest surface of the fixed guide rolls 20.

Since the lifting guide rolls 30 move up and down between the fixed guide rolls 20, the driving rolls 40 are provided in locations that do not disrupt the up and down movement of the lifting guide rolls 20 while enabling rotation of the fixed guide rolls 20. For example, the driving roll 40 is disposed at a distance in a lower side of the fixed guide roll 20, and may have a smaller diameter than that of the fixed guide roll 20.

The highest surface of the lifting guide roll 30 set in a state that lifting guide rolls 30 are descended to the lowest position is set to be the same height as the highest surface of the driving roll 40 in the dryer. Thus, the shuttle 50 moving by driving of the driving rolls 40 can perform horizontal movement while being supported by the lifting guide rolls 30 between the driving rolls 40.

The traveling roll 60 is provided as one pair. The electrode substrate S travels between the pair of travelling rolls 60 by a rotation friction force applied to one end of the electrode substrate S discharged to the outside of the outlet 12 by the shuttle 50 such that the electrode substrate S can travel further to the winding station.

That is, the electrode substrate S moved toward the outlet 12 is fed between the travelling rolls 60. The pair of travelling rolls 60 additionally provide a traveling force to the electrode substrate S, which has been separated from the shuttle 50 after being discharged from the outlet 12, to move the electrode substrate S to the winding station.

Figure 4:
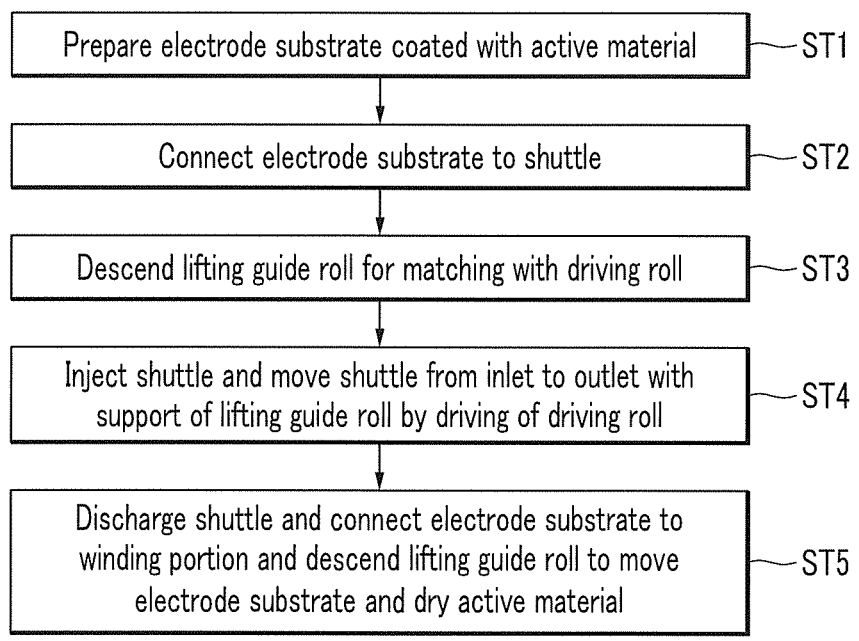
FIG. 4 is a flowchart of a control method of the dryer for the electrode substrate of the rechargeable battery according to the exemplary embodiment of the present invention.

FIG. 4 is a flowchart of a control method of the dryer of the rechargeable battery according to the exemplary embodiment of the present invention.

Referring to FIG. 4, a method for controlling the dryer according to the exemplary embodiment includes a first step ST1 for preparing an electrode substrate S coated with an active material, a second step ST2 for attaching the electrode substrate S to a shuttle 50, a third step ST3 for matching the highest surface of lifting guide rolls 30 to the highest surface of driving rolls 40 by descending the lifting guide roll 30, and a fourth step ST4 for connecting the electrode substrate S by feeding the shuttle 30 into an inlet 11 and discharging the shuttle 50 through an outlet 12.

During the first step ST1, an electrode substrate S coated with an active material may be prepared or an electrode substrate S that has been passed through a rolling process after primary drying of the coated active material may be prepared. During the second step ST2, the electrode substrate S to be dried is connected to the shuttle 50 that is provided in the outside of the drying oven 10.

During the third step ST3, the lifting guide rolls 30 are descended to be lower than the fixed guide rolls 20 to match the highest surface of the lifting guide rolls 30 and the highest surface of the driving rolls 40 (refer to FIG. 2).

Thus, the shuttle 50 attached to the electrode substrate S can perform forward movement with support of the driving rolls 40 and the lifting guide rolls 30 without disruption from the fixed guide rolls 20 in a lower portion of the fixed guide rolls 20.

During the fourth step ST4, the shuttle 40 is moved along a horizontal direction while being supported by the driving rolls 40 and the lifting guide rolls 30 and driven by the driving rolls 40 (refer to FIG. 2). As the shuttle 50 moves toward the outlet 12 from the inlet 11, the electrode substrate S is connected between the inlet 11 and the outlet 12 of the drying oven 10.

In addition, the electrode substrate S discharged through the outlet 12 is separated from the shuttle 50 and then supplied between the pair of travelling rolls 60. The electrode substrate S is applied with a rotation friction force from rotary driving of the travelling rolls 60 and thus moved to the winding station.

By connecting the electrode substrate S to the winding station, the electrode substrate S can be dried. The method for controlling the dryer according to the exemplary embodiment further includes a fifth step ST5 for drying the active material of the electrode substrate S while moving the electrode substrate S in a zigzagged manner by ascending the lifting guide rolls 30 (refer to FIG. 3).

During the fifth step ST5, the electrode substrate S can be spirally wound at the winding station so that the active material coated to the electrode S can be dried while moving the electrode substrate S hung in a zigzagged manner between the lifting guide rolls 30 and the fixed guide rolls 20 toward the outlet 12 from the inlet 11 of the drying oven 10.

In this case, for example, the travelling rolls 60 are separated from each other so that they do not disrupt the movement of the electrode substrate S, and as shown in FIG. 3, they may supply a rotary friction to the electrode substrate S.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

| <Description of symbols> | |
|---|---|
| 10: drying oven | 11: inlet |
| 12: outlet | 20: fixed guide roll |
| 30: lifting guide roll | 40: driving roll |
| 50: shuttle | 60: traveling roll |
| S: electrode substrate | ΔH: height difference |

What is claimed is:

1. A dryer for an electrode substrate of a rechargeable battery, comprising:
   a drying oven configured to dry a moving electrode substrate by feeding the electrode substrate to an inlet and discharging the electrode substrate through an outlet;
   fixed guide rolls provided at a distance from each other between the inlet and the outlet to guide the moving electrode substrate, each of the fixed guide rolls configured to remain fixed at a respective location in a lower portion in the drying oven;
   lifting guide rolls alternately arranged with the fixed guide rolls between the inlet and the outlet, the lifting guide rolls being movable between an ascended location and a descended location in a vertical direction, and each ascended to the ascended location at one side of a respective one of the fixed guide rolls when guiding the moving electrode substrate;
   driving rolls disposed to correspond to the lifting guide rolls at the descended location; and
   a shuttle configured to move toward the outlet from the inlet,
   wherein in the vertical direction, the fixed guide rolls are lower than the lifting guide rolls in the ascended location and higher than the lifting guide rolls in the descended location.

2. The dryer for the electrode substrate of the rechargeable battery of claim 1, wherein the shuttle is configured to be moved in a state of being connected with the electrode substrate and supported by the driving rolls and the lifting guide rolls.

3. The dryer for the electrode substrate of the rechargeable battery of claim 1, wherein the fixed guide rolls are provided in plural, and the lifting guide rolls are provided in plural so as to be ascended to a highest position and descended to a lowest position between the fixed guide rolls.

4. The dryer for the electrode substrate of the rechargeable battery of claim 3, wherein the lifting guide rolls have a highest surface and the fixed guide rolls have a lowest surface, and the highest surface of the lifting guide rolls descended to the lowest position is set to be lower than the lowest surface of the fixed guide rolls.

5. The dryer for the electrode substrate of the rechargeable battery of claim 1, wherein the fixed guide rolls have a lower side, the driving rolls are provided in plural and disposed at a distance from each other in the lower side of the fixed guide rolls.

6. The dryer for the electrode substrate of the rechargeable battery of claim 5, wherein the driving rolls have a highest surface, and the highest surface of the lifting guide rolls, set in the state that the lifting guide rolls are descended to the lowest position, is set to be at a height the same as the highest surface of the driving rolls.

7. The dryer for the electrode substrate of the rechargeable battery of claim 1, further comprising a travelling roll provided in an outer side of the outlet to make the electrode substrate travel.

8. A system for controlling a dryer for an electrode substrate of a rechargeable battery, comprising:
   a preparation station to prepare an electrode substrate coated with an active material;
   an attaching station to attach the electrode substrate to a shuttle;
   a matching station to match a highest surface of a plurality of lifting guide rolls in a drying oven and a highest surface of a plurality of driving rolls by descending the lifting guide rolls, the lifting guide rolls alternately arranged with a plurality of fixed guide rolls in the drying oven between an inlet and an outlet of the drying oven, and each descended at one side of a respective one of the fixed guide rolls; and
   a connecting station to connect the electrode substrate by feeding the shuttle to the inlet of the drying oven and discharging the shuttle through the outlet of the drying oven while being supported and driven by the driving rolls and supported by the lifting guide rolls,
   wherein the lifting guide rolls are movable between an ascended location and a descended location in a vertical direction, and the fixed guide rolls are lower than the lifting guide rolls in the ascended location and higher than the lifting guide rolls in the descended location in the vertical direction, and
   wherein each of the fixed guide rolls is configured to remain fixed at a respective location in a lower portion in the drying oven.

9. The system of claim 8, further comprising:
   a moving station to move the electrode substrate hung between the lifting guide rolls and the fixed guide rolls in a zigzagged manner by ascending the lifting guide rolls to dry the electrode substrate.

* * * * *